(No Model.)

J. W. RICE.
CAR BRAKE.

No. 280,244. Patented June 26, 1883.

Witnesses.
George V. Curtis.
C. M. Hill.

Inventor:
John W. Rice.
By T. Alentis,
his atty.

UNITED STATES PATENT OFFICE.

JOHN W. RICE, OF SPRINGFIELD, MASSACHUSETTS.

CAR-BRAKE.

SPECIFICATION forming part of Letters Patent No. 280,244, dated June 26, 1883.

Application filed March 2, 1883. (No model.)

*To all whom it may concern:*

Be it known that I, JOHN W. RICE, of Springfield, in the county of Hampden and State of Massachusetts, have invented a new and useful Improvement in Railway-Car Brakes, of which the following is a specification and description.

The object of my invention is to provide a system of levers pivoted to the brake-beams of a railway-car truck, with chains connecting the said levers together and with the brake-staff at either end of the car, whereby the brake-shoes secured to said beams may be applied simultaneously to opposite sides at the tread of each and all the wheels of the trucks of the car; and I accomplish this by the mechanism substantially as described, and illustrated in the accompanying drawings, in which—

Figure 1:
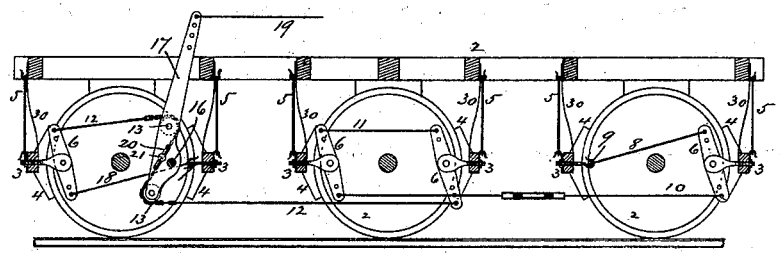
Figures 4, 5, 6:
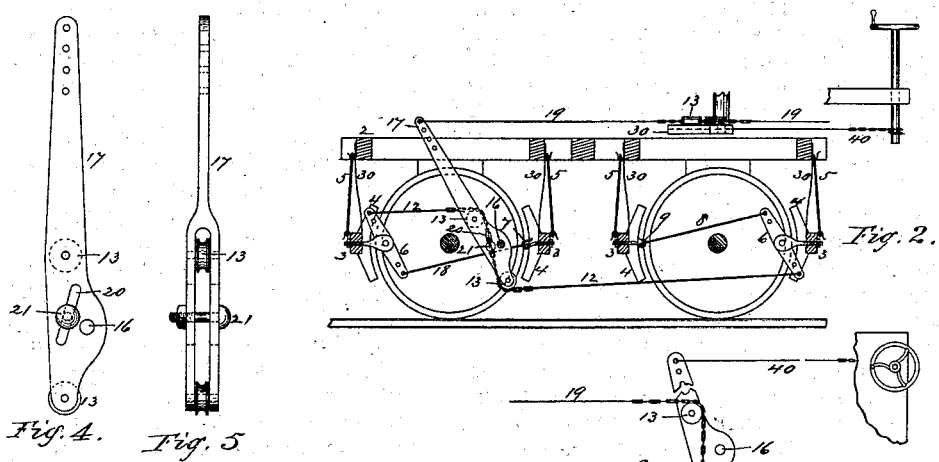
Figure 3:
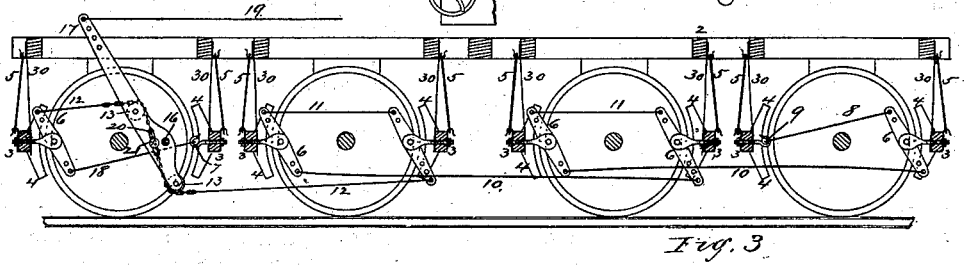
Figure 7:
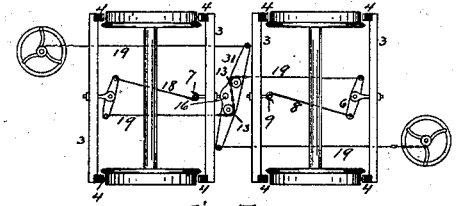

Figure 1 is a longitudinal vertical section, midway its width, of any ordinarily-constructed six-wheeled railway-car truck having my system of brakes applied thereto. Fig. 2 is a longitudinal vertical section, midway its width, of an ordinary four-wheeled car-truck having my invention applied thereto. Fig. 3 is a similar sectional view of an eight-wheeled car-truck, showing the brake-beams, shoes, and operating-lever connected therewith. Fig. 4 is a side view of the operating-lever. Fig. 5 is an edge view of the same. Fig. 6 is a plan view of the double equalizing-lever, which is preferably secured to the car between the trucks and in a horizontal position; and Fig. 7 is a plan view of the levers used in a horizontal position.

In the drawings, 2 represents the frame of an ordinary railway-car truck, provided with the usual brake-beams, 3, suspended from the frame by the links 5, with the brake-shoes 4 pivoted or secured to the brake-beams, and held away from the wheels when not in use each by a spring, 30, in the ordinary manner. Instead, however, of arranging the brake-shoes and brake-beams only on opposite sides of each two adjacent pairs of wheels, as is usually done, I provide a brake-beam with shoes on each side of each pair of wheels in the truck, so that the brake-shoes may be forced against the opposite sides of each pair of wheels at the tread.

To the inner brake-beam of each end pair of wheels of the truck, and about midway its length, I secure a brake-chain, preferably by a hook or ring adapted to secure a chain thereto; and to each other brake-beam of the truck, and about midway its length, I pivot a lever, 6, with chains secured to said inner brake-beam and to the ends of said levers, so that by means of an equalizing-lever, as 17, and a similar double equalizing-lever, 31, pivoted to the car, and an ordinary brake-staff at the end of the car, all the brake-shoes of each truck or of all the trucks of the car may be applied simultaneously and against two opposite sides of each wheel at the tread.

Fig. 1 represents a six-wheeled truck, to the inner brake-beam, 3, of the end pair of wheels of which I secure, at 9, a chain, 8, whose other end is secured to the upper end of the lever 6 of the end brake-beam, to the opposite end of which lever is secured a chain, 10, which extends and is secured to the lower end of the lever 6, pivoted to the brake-beam on the opposite side of the next pair of wheels. To the upper end of this lever a chain, 11, is secured, which extends back and is secured to the upper end of the lever 6, pivoted to the brake-beam on the opposite side of the same pair of wheels. To the lower end of this lever 6 is secured a chain, 12, which extends to and around the pulleys 13 of a lever, 17, and which is pivoted to any convenient point on the truck, and the end of said chain is secured to the upper end of the lever 6, pivoted to the outer brake-beam of the end pair of wheels, and to the lower end of this lever is attached a chain, 18, extending back and secured to the inner brake-beam on the opposite side of the same pair of wheels.

To the upper end of the lever 17 is attached a chain, 19, which extends back and around the pulleys 13 of a double equalizing-lever, 31, pivoted in a horizontal position to the lower side of the car, between the trucks, and thence to the upper end of a similar lever, 17, pivoted to the other truck of the car, and a chain, 40, is secured to each end of this double equalizing-lever, 31, and extends one to one end of the car and the other to the other end of the car, and both secured to the ordinary brake-staff.

It will be seen that by revolving either brake-staff or drawing upon either chain 40 the lever 31 will take up the slack and draw upon the chain 19, lever 17, and all the series of levers 6, forcing all the brake-beams and brake-shoes inward against all the wheels at the tread simultaneously and with the same degree of force or pressure, as the same power applied to one lever, 6, is imparted directly to the others with which it is connected. In using the lever 17, I prefer to make a slot, 20, extending in the direction of the chain 12, with a bolt, 21, inserted in said slot and extending through the chain, and the bolt adapted to slide in said slot, so that, should the chain break or any lever become broken in applying the brake either side of the said lever 17, the brakes on the other side will be securely held by the bolt slipping quickly to the end of the slot, and thereby preventing the chain from being disengaged entirely from the said lever. The double equalizing-lever 31 should also be made with this slot and sliding bolt, as above described, for the same purpose.

By this system of levers 6, applied to pendent or movable brake-beams on both sides of each pair of wheels, and equalizing-levers, it will be seen that the brakes may be applied to both sides of every pair of wheels at the tread under a car, and all applied simultaneously, and with the same degree of power, and with much less force required to apply them than is required in the ordinary systems. It will be seen that this system may also be used as a train-brake by using a double equalizing-lever, 31, between the two adjacent end trucks of every two cars, so that the chain 19 may extend the whole length of the train and be applied by the engineer or other employé designated for such service.

For use upon horse-railway cars, or with cars having only two pairs of wheels, the levers 6 might be pivoted to the brake-beams in a horizontal position, and the double equalizing-lever 31 would be pivoted between the pairs of wheels in a horizontal position, and the chain 10, extending from the lever on one outer brake-beam to the lever on the other outer brake-beam, would extend around the pulleys 13, as shown in Fig. 7, and the chain 40 would extend from one end of this lever 31 to the brake-staff at one end of the car, which is represented at 45, and another chain from the other end of the lever to the brake-staff at the other end of the car.

As the brake-chain which extends around the pulleys 13 of the equalizing-lever 17 and of the double equalizing-lever 31 is continuous, it is evident that the power applied is the same at all the brakes, so that if any one chain should become stretched or worn, or changed in its length from any other cause, this fault will have no effect whatever upon the other chains, as the equalizing-lever will remedy that difficulty, the chain passing around its pulleys 13, yielding or moving in either direction freely, to remedy any trouble of that kind. This combination of the equalizing feature with a system of short levers pivoted to the brake-beams, as above described, is a great advantage, as the strain upon the whole brake apparatus is evenly and uniformly divided and distributed and there is less liability of breakage. The levers 17 and 31 are both alike in principle and construction, except that the latter is made double, with both ends extended and adapted to have a chain attached to either or both ends and connected with a brake-staff in either or both directions, to apply the power.

It is of course evident that rods may be used instead of chains, where flexibility is not desired, to save expense.

Having thus described my invention, what I claim as new is—

1. The combination of a series of movable brake-beams, 3, secured in position on both sides of each pair of wheels of a railway-car, a series of levers, 6, pivoted to said brake-beams, an equalizing-lever provided with pulleys 13, and a series of chains or rods connecting said levers 6 and brake-beams, one of said chains extending around the pulleys 13 of said equalizing-lever, and a chain connecting the end of said equalizing-lever with a brake-staff or mechanism for applying the power to said equalizing-lever, substantially as described.

2. The combination of a series of movable brake-beams, 3, secured in position on both sides of each pair of wheels of a railway-car, a series of levers, 6, pivoted to said brake-beams, an equalizing-lever, 17, provided with pulleys 13, a series of chains or rods connecting said levers 6 and brake-beams with one of said chains extending around the pulleys of said equalizing-lever 17, a double equalizing-lever, 31, provided with pulleys 13, a chain extending around the pulleys 13 of said double equalizing-lever 31, and secured at one end to the lever 17 at one truck, and at the other end to a similar lever 17 at another truck, and two brake-staff chains, one connected to one end of said lever 31 and the other to the other end, substantially as described, and for the purpose set forth.

JOHN W. RICE.

Witnesses:
 T. A. CURTIS,
 G. V. CURTIS.